(12) United States Patent
Sander

(10) Patent No.: US 7,305,906 B2
(45) Date of Patent: Dec. 11, 2007

(54) BEARING ARRANGEMENT FOR AT LEAST ONE GEARWHEEL

(75) Inventor: Edmund Sander, Leonberg (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 348 days.

(21) Appl. No.: 10/517,449

(22) PCT Filed: May 17, 2004

(86) PCT No.: PCT/EP2004/005264

§ 371 (c)(1),
(2), (4) Date: Dec. 9, 2004

(87) PCT Pub. No.: WO2004/111499

PCT Pub. Date: Dec. 23, 2004

(65) Prior Publication Data

US 2006/0185455 A1    Aug. 24, 2006

(30) Foreign Application Priority Data

Jun. 14, 2003   (DE) ............................... 103 26 866

(51) Int. Cl.
*F16H 57/02* (2006.01)
*F16H 57/04* (2006.01)
*F16H 61/00* (2006.01)
*F16C 35/00* (2006.01)

(52) U.S. Cl. .................................... 74/606 R; 384/428
(58) Field of Classification Search .............. 74/606 R, 74/640; 384/416, 428
See application file for complete search history.

(56) References Cited

U.S. PATENT DOCUMENTS

| 4,182,199 | A | * | 1/1980 | Watson ...................... 74/606 R |
| 4,462,770 | A | * | 7/1984 | Haupt .......................... 418/39 |
| 5,261,750 | A | * | 11/1993 | Eckhardt et al. ............. 384/455 |
| 5,966,998 | A | * | 10/1999 | Hara et al. ................. 74/606 R |
| 6,769,809 | B2 | * | 8/2004 | Maret ......................... 384/512 |

FOREIGN PATENT DOCUMENTS

| DE | 24 47 177 |   | 4/1976 |
| DE | 199 50 584 A1 |   | 4/2001 |
| JP | 05157156 A | * | 6/1993 |

* cited by examiner

*Primary Examiner*—Tisha Lewis
(74) *Attorney, Agent, or Firm*—Crowell & Moring LLP

(57) ABSTRACT

A bearing arrangement for at least one gearwheel, particularly for a reversing wheel of a reverse gear in a transmission housing of a manual transmission, having a gear that is rotatably supported on a gear axle. At least the one end of the gear axle is fixed or supported in the transmission housing. One side of the gear axle is received in a bearing element which is bolted within the transmission housing from the outside via a fixing element.

4 Claims, 3 Drawing Sheets

BEARING ARRANGEMENT FOR AT LEAST ONE GEARWHEEL

This application claims the priority of PCT/EP04/005264 filed May 17, 2004 which claims priority to German Application No. 10326866.9 filed Jun. 14, 2003 which are expressly incorporated by reference herein.

BACKGROUND OF THE INVENTION

The present invention is based on a bearing arrangement for at least one gearwheel particularly for a reversing wheel of a reverse gear in a transmission housing of a manual transmission, having a gear rotatably supported on a gear axle, wherein at least one end of the gear axle is fixed or supported in bearings in the transmission housing.

DE OS 24 47 177 discloses a bearing for an intermediate shaft in a transmission housing. To simplify production of the transmission housing, one end of the intermediate shaft carrying the gearwheel is fixed by a bolt that is guided from the outside in a guide bore made in the transmission housing.

SUMMARY OF THE INVENTION

An object of the present invention is to further improve, in particular, the bearing arrangement for a reversing wheel of the reverse gear with respect to production costs and ease of assembly.

This object is attained by the one side of the gear axle being received in a bearing element which is bolted within the gear housing from the outside via a fixation element.

The one side of the gear axle carrying the at least one gearwheel is received in a separate bearing element, which is bolted within the transmission housing from the outside by the fixation element. This provides assembly advantages because the entire unit comprising the gearwheel, the gear axle and the bearing arrangement can be preassembled before it is fixed inside the transmission housing.

In an interior wall of the transmission housing a first recess for supporting or receiving the bearing element is provided, such that the inner contour of the recess is adapted to the at least partially circular-arc-shaped outer contour of the bearing element. This ensures a positive locking seat of the bearing element and an axially parallel orientation of the gear axle to the one or more gear shafts extending parallel thereto.

To axially adjust the bearing element, which is configured as a bearing block, a locating pin is provided on the bearing element, which is guided in a second recess in the interior wall of the transmission housing. The recess has a limit stop, which is positioned such that the bore in the transmission housing for receiving the fixing bolt axially corresponds to the thread provided in the bearing block.

Advantageously the gear axle has a larger axle diameter between the bearing element and the gear so as to form an axial locating face for the gear.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 4:
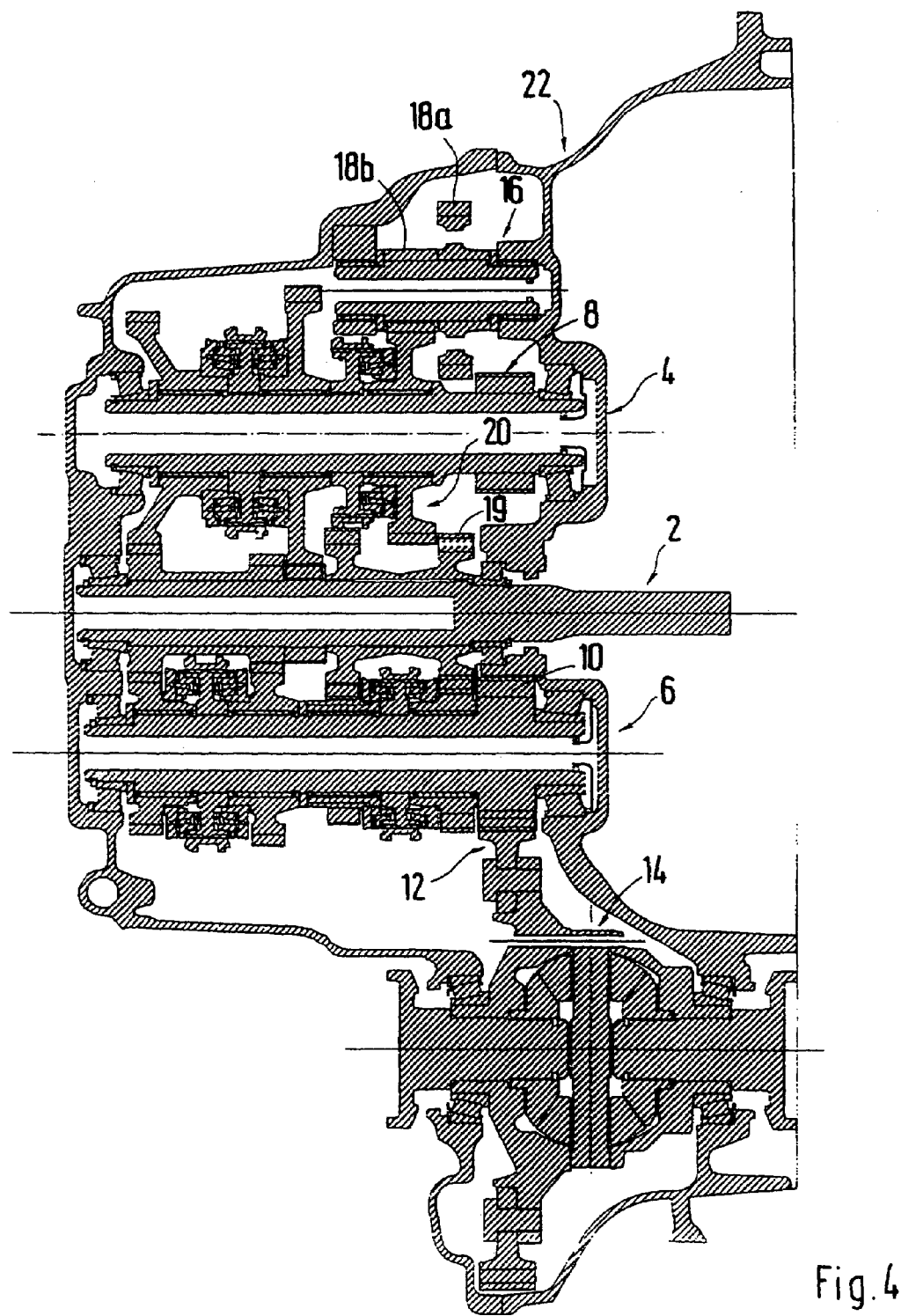
FIG. 4 is a schematic cross-sectional view of the gear set arrangement of a three-shaft transmission.

FIG. 4 shows the gear set arrangement of a three-shaft transmission, in which in addition to a gear input shaft 2, two gear output shafts 4 and 6 are provided, both of which communicate with the ring gear 12 of an axle differential 14 via a gear 8 and 10, respectively. For the changeover of a reverse gear, a gear axle 16 is provided for reversing the direction of rotation, on which a gear 18 with two side-by-side gear rims 18a, 18b is rotatably supported. On the input side, the gear 20 is driven by the gear rim 18a which meshes with a gear 19 disposed on the gear input shaft 2. Via the gear rim 18b which meshes with a gear 20 disposed on the gear output shaft 4 and which can be shifted via the clutch 21, the power flow is transmitted to the gear output shaft 4 via the gear 18 to achieve a reversal of the direction of rotation of the gear output shaft 4.

Figure 1:
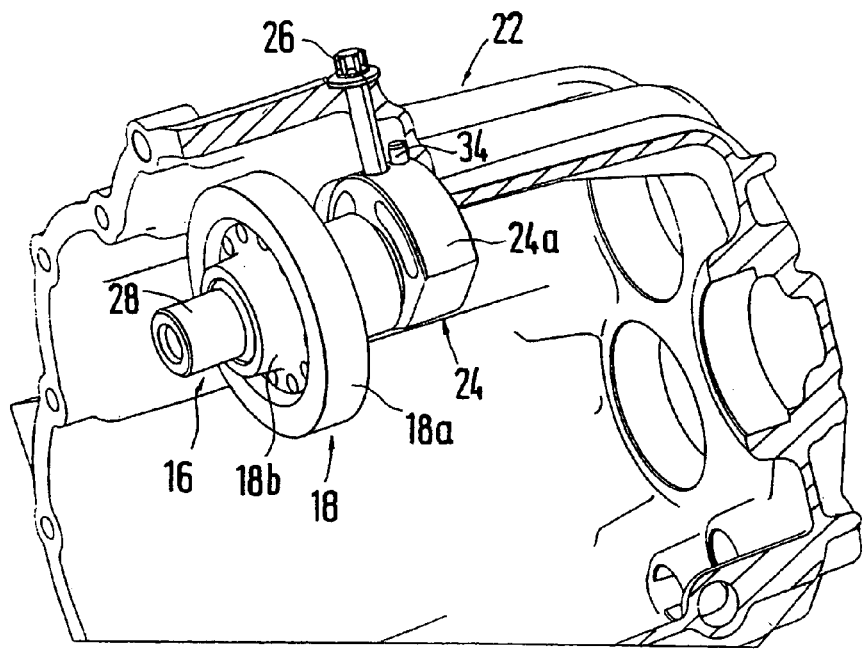
FIG. 1 is a first cutaway perspective view of a transmission housing.
Figure 2:
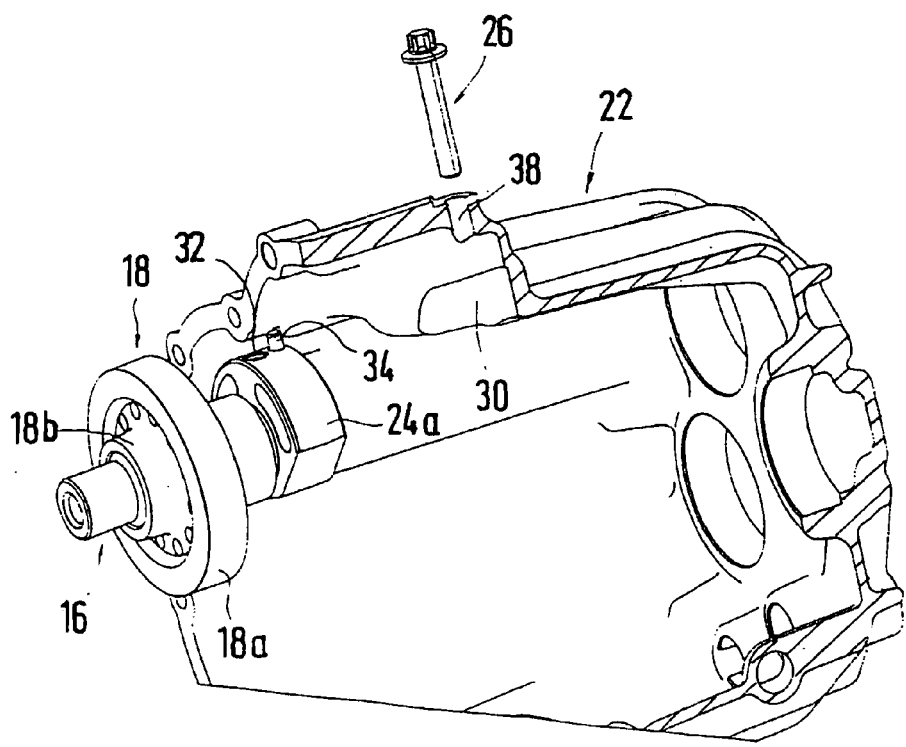
FIG. 2 is a second cutaway perspective view of the transmission housing.
Figure 3:
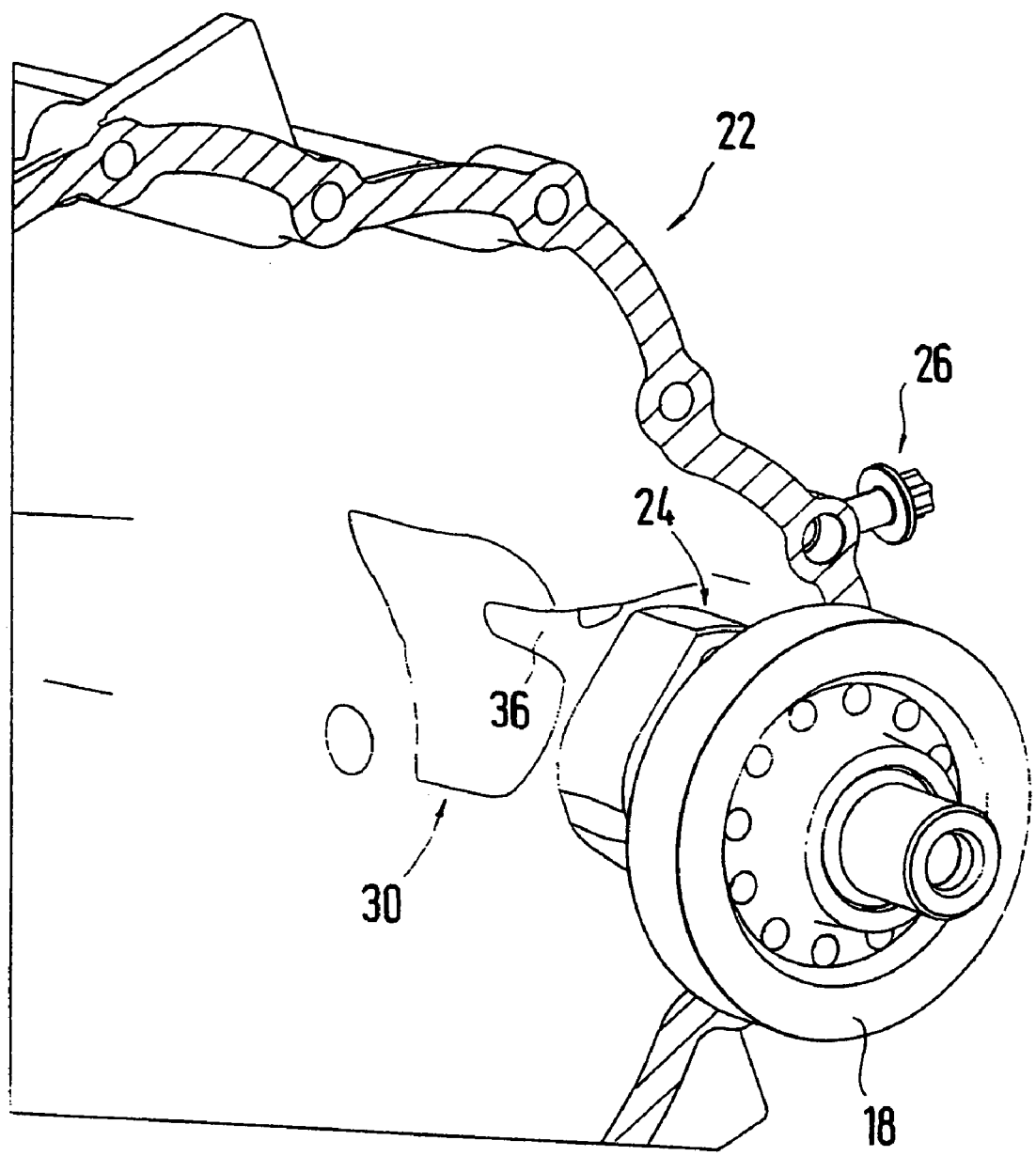
FIG. 3 is an enlarged third cutaway perspective view of the transmission housing.

The gear axle 16 is fixed in a transmission housing 22. The construction or support in bearings of the gear axle 16 will now be described in greater detail with reference to FIGS. 1-3. The one end of the gear axle 16 is rotationally fixed in a bearing element configured as a bearing block 24. When the gear axle 16 is installed, the bearing block 24 is fixed within the transmission housing 22 by a bolt 26. The other end 28 of the gear axle 16 is received in a known type of transmission housing cover (not depicted). The bearing block 24, which is made, for example, from an extrusion profile, has a circular-arc-shaped outer contour 24a, which when installed is accommodated in a recess 30 of the transmission housing 22. The inner contour of the recess 30 is likewise circular-arc-shaped and is adapted to the outer contour 24a of the bearing block 24. The circular-arc-shaped outer contour 24a is provided with the thread for receiving the bolt 26. Laterally offset to the threaded hole 32, a locating pin 34 is provided which is guided in a second recess 36 (FIG. 3) formed in the transmission housing 22. The recess 36 and the locating pin 34 are dimensioned or oriented such that the latter is seated against or strikes the end of the conically extending recess 36 when the threaded hole 32 is aligned with the opening 38 for receiving the bolt 26 that is provided in the transmission housing 22. This provides a self-locating position for fixing the bearing block 24 of the gear axle 16 in the transmission housing 22 in a simple manner. Between the gear 18 and the bearing block 24, the gear axle 16 has a larger axle diameter, which serves as an axial locating face for the gear 18.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Bearing arrangement for at least one gear wheel, having a gear having at least one end of a gear axle is fixed or supported in bearings in a transmission housing, wherein one side of the gear axle is received in a bearing element which is bolted within the housing from the outside via a fixing element, wherein a first recess is provided in an inner wall of the housing for seating or receiving the bearing element, and an inner contour of the recess is adapted to an at least partially circular-arc-shaped outer contour of the bearing element.

2. Bearing arrangement as claimed in claim 1, wherein a locating pin fixed to the bearing element and guided in a second recess in the inner wall of the housing is provided for axial adjustment of the bearing element configured as a bearing block or of the gear axle.

3. Bearing arrangement as claimed in claim 1, wherein the gear axle has a larger axle diameter between the bearing element and the gear wheel, which larger axle diameter serves as an axial locating face for the gear wheel.

4. Bearing arrangement as claimed in claim 1, wherein the at least one gear wheel is a reversing wheel of a reverse gear in a manual transmission housing.

* * * * *